Nov. 12, 1974 W. LAUE ET AL 3,848,061
PROCESS FOR PREPARING CONCENTRATED FLUOROSILICIC ACID
Filed July 15, 1971 4 Sheets-Sheet 4

INVENTOR.
WOLFGANG LAUE
BY ECKEHARD SCHREIDER
FRIEDRICH HEYENGA

United States Patent Office 3,848,061
Patented Nov. 12, 1974

3,848,061
PROCESS FOR PREPARING CONCENTRATED FLUOROSILICIC ACID
Wolfgang Laue and Eckehard Schreiber, Waltrop, and Friedrich Heyenga, Lunen, Germany, assignors to Firma Gewerkschaft Victor Chemische Werke, Castrop Rauxel, Germany
Filed July 15, 1971, Ser. No. 162,787
Claims priority, application Germany, July 16, 1970, P 20 35 300.8
Int. Cl. C01b 7/00, 33/00, 33/12
U.S. Cl. 423—341                                   5 Claims

ABSTRACT OF THE DISCLOSURE

A process for preparing a concentrated aqueous solution of fluorosilicic acid from a more diluted solution of fluorosilicic acid and simultaneously recovering hydrogen fluoride and silicon tetrafluoride from a gaseous mixture containing the same, such as the mixture that is formed in recovering hydrogen fluoride from aqueous solutions of fluorosilicic acid by means of a polyglycol.

---

Figure 1:
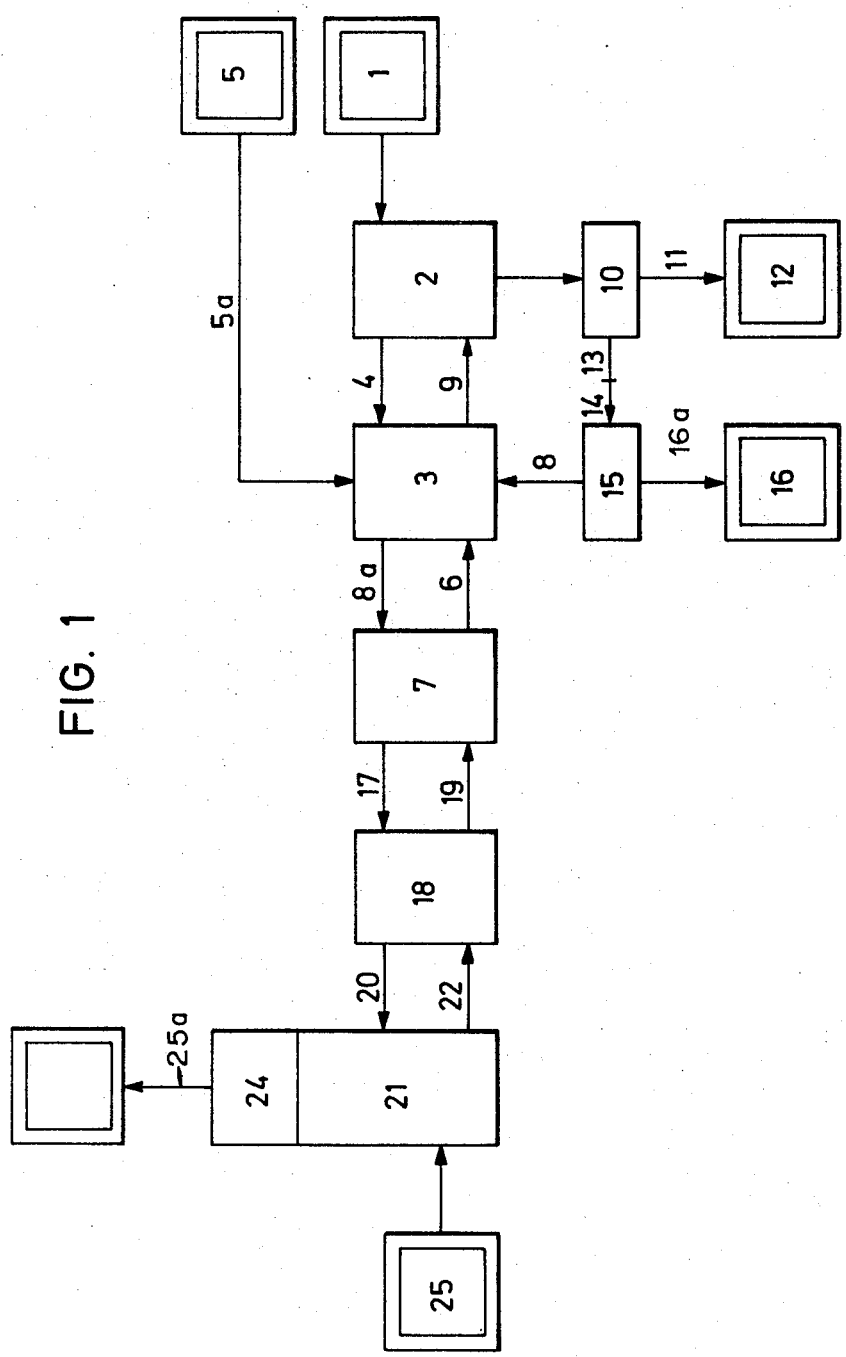
FIG. 1 is a flow diagram illustrating a specific embodiment of the process of the invention.

This invention relates to a process for preparing concentrated fluorosilicic acid.

There are many processes directed to the recovery of fluorosilicic acid from aqueous hydrofluoric acid. In these processes, the concentration of the fluorosilicic acid solution is critical for the operability and economics of recovery of the hydrofluoric acid.

There are also a number of processes known for recovering hydrofluoric acid from aqueous fluorosilicic acid or its mixtures with hydrofluoric acid, in which an about 28% fluorosilicic acid is contacted at above the condensation temperature of the vapors with an aliphatic polyether or polyol in a polyglycol column in a countercurrent flow method of treatment, the washed out vapors which are to be used for the further manufacture of fluorosilicic acid are then separated off, the liquid absorption agent loaded with hydrofluoric acid is thereafter treated for removal of the silicon tetrafluoride, preferably in a concentrating column with vapor-form hydrofluoric acid and/or water vapor as recycle in countercurrent flow relationship to the absorption agent at a temperature above the condensation temperature of the silicon tetrafluoride-containing vapors. Thereafter, from the remaining absorbent, and hydrofluoric acid by vacuum or heating with a propellent vapor or gas or through chemical reaction is separated off and the absorbent regenerated.

The vapors washed out with the aliphatic polyethers or polyols, particularly polyglycols, contain in addition to the water vapor, 20–25% $SiF_4$ which, for example, can be recovered through condensation as an about 20% $H_2SiF_6$ solution. The hydrolysis takes place in a condenser in accordance with the following reaction scheme

[a]    $3SiF_4 + 2H_2O \rightleftarrows 2H_2SiF_6 + SiO_2$
[b]    $SiF_4 + 2H_2O \rightleftarrows 4HF + SiO_2$
[c]    $SiF_4 + 2HF \rightleftarrows H_2SiF_6$ The $SiO_2$ which separates out is filtered out from the condensed $H_2SiF_6$ solution and dried. The gases thereby freed are recycled into the condenser while the 20% $H_2SiF_6$ solution is recovered for use as starting material in the process.

In order that the water content in the circulation is not continuously increased, the solution to be returned into the process must be an about 28% $H_2SiF_6$ solution. The recovered 20% $H_2SiF_6$ solution must therefore be concentrated before it is reconducted into the polyglycol column. For carrying out the process, there is not of course any necessity to use a 28% $H_2SiF_6$-containing starting solution. The process can be carried out with solutions of lower concentration, but for technical and especially economic reasons, that is not as desirable. However, if there are used in the process concentrations of $H_2SiF_6$ of less than 28%, there remains the necessity that the $H_2SiF_6$ be reconcentrated in the system with the view to preventing the increasing content of water.

Also as a rule, as starting material for the recovery of hydrofluoric acid from aqueous fluorosilicic acid, there are available only aqueous solutions of relatively low concentration amounting at most to about 20%. Consequently, it is necessary that this solution also, and preferably together with the $SiF_4$-containing vapors drawn off from the polyglycol column, be concentrated to a $H_2SiF_6$ content of 28%. This additional process step burdens the entire procedure in that energy in the form of steam must be supplied. Further, in this concentration step, a separation of $SiO_2$ which can very easily lead to a blocking up of the entire concentration column, may be avoided by adding HF, the end product, into the concentration column.

In addition to these polyglycol processes there is another process in which according to reaction equations [a], [b] and [c] above set out, as well as the following

[d]    $H_2SiF_6 \rightarrow 2HF + SiF_4$ from aqueous fluorosilicic acid, hydrofluoric acid is recovered (Stauffer Chemical Company, New York, N.Y., Swiss Pat. No. 455,722, Tennessee Corporation, New York, N.Y., U.S. Pat. No. 3,218,125).

All of the aforesaid processes have the disadvantage that because of a low concentration of the fluorosilicic acid, it is necessary to get rid of large amounts of water. This water is introduced either for carrying out the hydrolysis reactions [a] and [b] or is introduced with the starting material in the process or it is introduced in the interest of obtaining a satisfactorily pure exhaust gas.

In accordance with the invention there is now provided the possibility to avoid the expense for additional steam for use in the necessary concentration of fluorosilicic acid. This objective is achieved without the addition of large amounts of HF to the column.

In accordance with the invention there is now provided a process for preparing concentrated $H_2SiF_6$ solutions from gas-vapor mixtures which contain $SiF_4$, water and HF and solutions of $H_2SiF_6$ of lower concentration which comprises treating the gas-vapor mixture, the $H_2SiF_6$ of lower concentration, and the heated discharge of an after arranged reactor to hydrolysis at the boiling temperature of the acid mixture in a first substantially completely heat-insulated gas-liquid reactor whereby the greatest portion of the $SiF_4$ is absorbed out from the vapor mixture under formation of additional $H_2SiF_6$ and $SiO_2$, taking off from the column the $SiO_2$-containing $H_2SiF_6$ solution, separating the $SiO_2$ from said solution, withdrawing substantially the entire water vapor containing small amounts of $SiF_4$ from the first reactor and introducing the same into an after arranged similarly heat-insulated gas-liquid reactor in which further $SiF_4$ is absorbed with simultaneous addition of hot $H_2SiF_6$ which is derived from an after installed rectification column, withdrawing the vapors from said second reactor together with small amounts of HF and conducting the same into a rectification column, separating in said rectification column by condensation a part of the water vapor and all of the fluorine-containing compounds and withdrawing substantially $SiF_4$-free water vapor from the head of the rectification column, and withdrawing $H_2SiF_6$ solution from the rectification column which is in turn introduced into the second gas-liquid reactor.

The introduction of small amounts of HF, for instance into the vapors introduced into the rectification column inhibits to a large degree the separation of $SiO_2$ during the distillative concentration of the $H_2SiF_6$. The HF addition can also be carried out separate from the introduction of the vapor stream into the rectification column.

In accordance with the process of the invention, the heat of the $SiF_4$-containing exit vapors from the polyglycol column is sufficient for effecting the entire concentration of the about 20% $H_2SiF_6$ starting solution so that practically no steam is required for working up of the raw material and the hydrolysis and concentration of vapors from the polyglycol column.

Whereas before the invention the $SiF_4$-containing vapors only are condensed, which requires cooling, the new process includes a partial condensation step which results in the direct recovery of an about 28% $H_2SiF_6$ solution, i.e. concentration of the total starting solution to the desired degree.

It should be noted that the process of the invention, in contrast to prior-art processes, results in an end gas of a high degree of purity, which means that excellent yields as well as high concentrations of the withdrawn $H_2SiF_6$ solution are obtained.

The process of the invention will be further illustrated in connection with FIG. 1 of the drawing which represents a flow diagram of the process of the invention.

As shown in the drawing, the crude material 1, for instance a 20% $H_2SiF_6$ solution which has been heated up to 90° C. in heat exchanger 2 by means of the exit liquid from a gas-liquid reactor 3 is introduced by a conduit 4 into the reactor 3. The reactor is, as are the subsequently arranged reactors 7 and 18, thermally insulated and constructed as bubble columns, spray washers or other types of gas-fluid reactors. Into this reactor there are simultaneously introduced the $SiF_4$-containing vapor-gas mixture 5 from the polyglycol column via conduits 5a and the flow-off condensate of the subsequently arranged gas-fluid reactor 7 is introduced over conduit 6. Further, by conduit 8 the gas which has been freed in the drying of the $SiO_2$ is introduced into the reactor. The reactor is maintained at the boiling temperature of the sump where the collected fluorosilicic acid is at a temperature of about 108° C. At the head of the column there is taken off $H_2O$, $SiF_4$ and HF in the form of a vapor mixture via conduit 8a. This vapor mixture is then introduced into the reactor 7 while at the foot of the reactor 3, by a conduit 9, an about 28% fluorosilicic acid is taken off.

After cooling to about 90° C. in heat exchanger 2, the concentrated $H_2SiF_6$ solution is introduced into a filter 10 where the $SiO_2$ entrained or carried along with the solution is separated off and the $SiO_2$-free solution is then fed over conduit 11 to receiver 12 for further use. The separated $SiO_2$ is fed over chute 13 and the subsequently arranged helix or worm 14 into the rotating oven 15 where it is dried and then taken off by conduit 16a as a by-product of the process. The gases and vapors formed in the drying are led by conduit 8 into the reactor 3. The return of these gases and vapors into the reactor 3 is not absolutely necessary, since they can also, for instance, be introduced into the reactor 7 or 18.

In reactor 7, the same process is carried out as was carried out in reactor 3. The sump temperature, however, lies somewhat lower than that which was present in reactor 3, corresponding to the lower concentration of the collected $H_2SiF_6$ solution. At the head of the reactor there is taken off the water-$SiF_4$-HF vapors via conduit 17 and these are then led into the reactor 18 from whose sump over conduit 19 the therein collected $H_2SiF_6$ solution is taken off and fed into reactor 7.

The sump temperature of the reactor 18 is also below that of the sump temperature of the previously arranged reactor 7 and amounts in this case to about 103° C. Otherwise, this reactor is operated similarly to the previously arranged reactor. The vapors are taken off at the head and led over conduit 20 into a column 21 which is operated at a sump temperature of about 100–102° C. and the formed $H_2SiF_6$ solution is led over line 22 into reactor 18. In column 21 all of the fluorine compounds are collected in the aqueous $H_2SiF_6$ which leaves column 21 over conduit 22 into the reactor 18. At the column head of the dephlegmator 24 a reflux is installed. There is then taken off via conduit 23 the water vapors substantially free of fluorine.

As any deposition of $SiO_2$ results in clogging of the column, the formation of solid $SiO_2$ must be avoided by simultaneously introducing into this column via conduit 25a small amounts of HF. There can also be introduced into the previously arranged reactors 18, 7 and 3 HF in small amounts for avoiding the clogging of these reactors. In general the gases taken off from the polyglycol column and vapors already contain small amounts of HF which is sufficient to prevent any $SiO_2$ clogging in the reactor 3.

As is known the solution and vapors involved in the process are strongly corrosive to metal. With this in mind precautions must be taken so that the reactors, conduits, pumps, etc., all be constructed of corrosion-proof material or be provided with linings of such material. For this purpose, for instance, Teflon has proved satisfactory.

The example which has been used to illustrate the process of the invention describes a procedure utilizing three reactors. It is possible of course according to the $H_2O:SiF_4$ relationship in the entering gas stream to use a greater or lesser number of reactors. In general, however, there are used two or three gas-liquid reactors.

Figure 2:
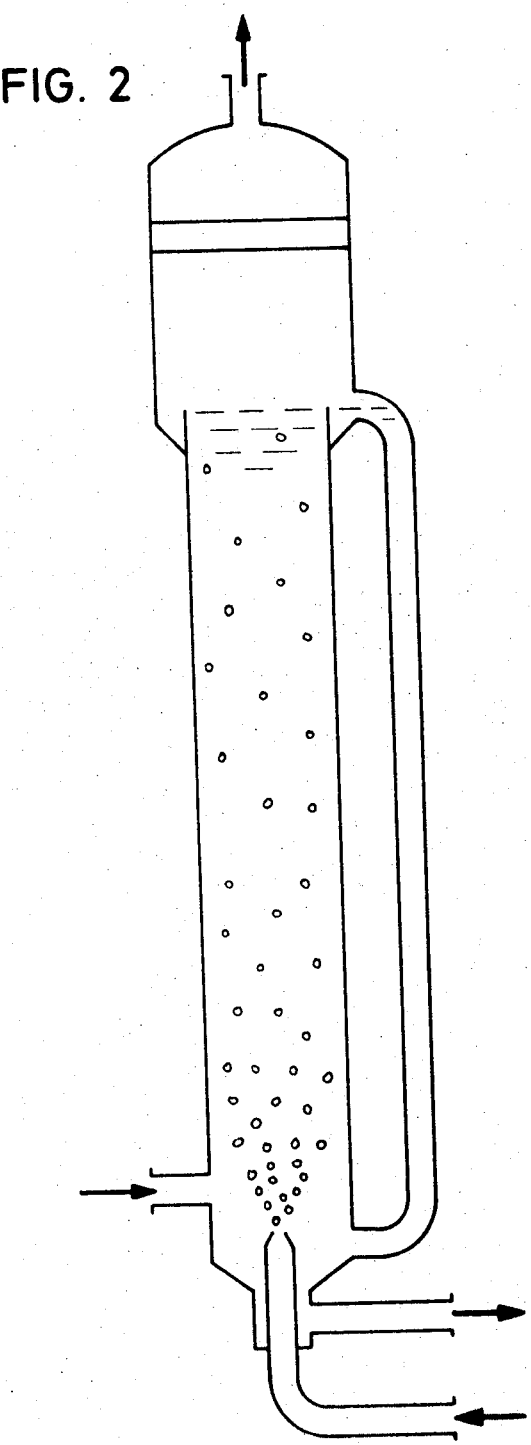
FIG. 2 shows a gas-liquid reactor in form of a bubble column.

There are preferred for use as the gas-liquid reactors for carrying out the process of the invention the known bubble columns which are provided in a particularly suitable form and which can be obtained without special ordering or construction being required. Further, when using the bubble columns, stoppages due to the $SiO_2$ clogging are completely eliminated. A disadvantage associated with this type of column is that the high pressure losses of this type of reactor so that gas pumps in the vapor conduits, for example 8a, 17 and 20, are necessary. On the other hand, circulation pumps for the liquid are not required. The principle of a bubble column has been illustrated in FIG. 2.

Figure 3:
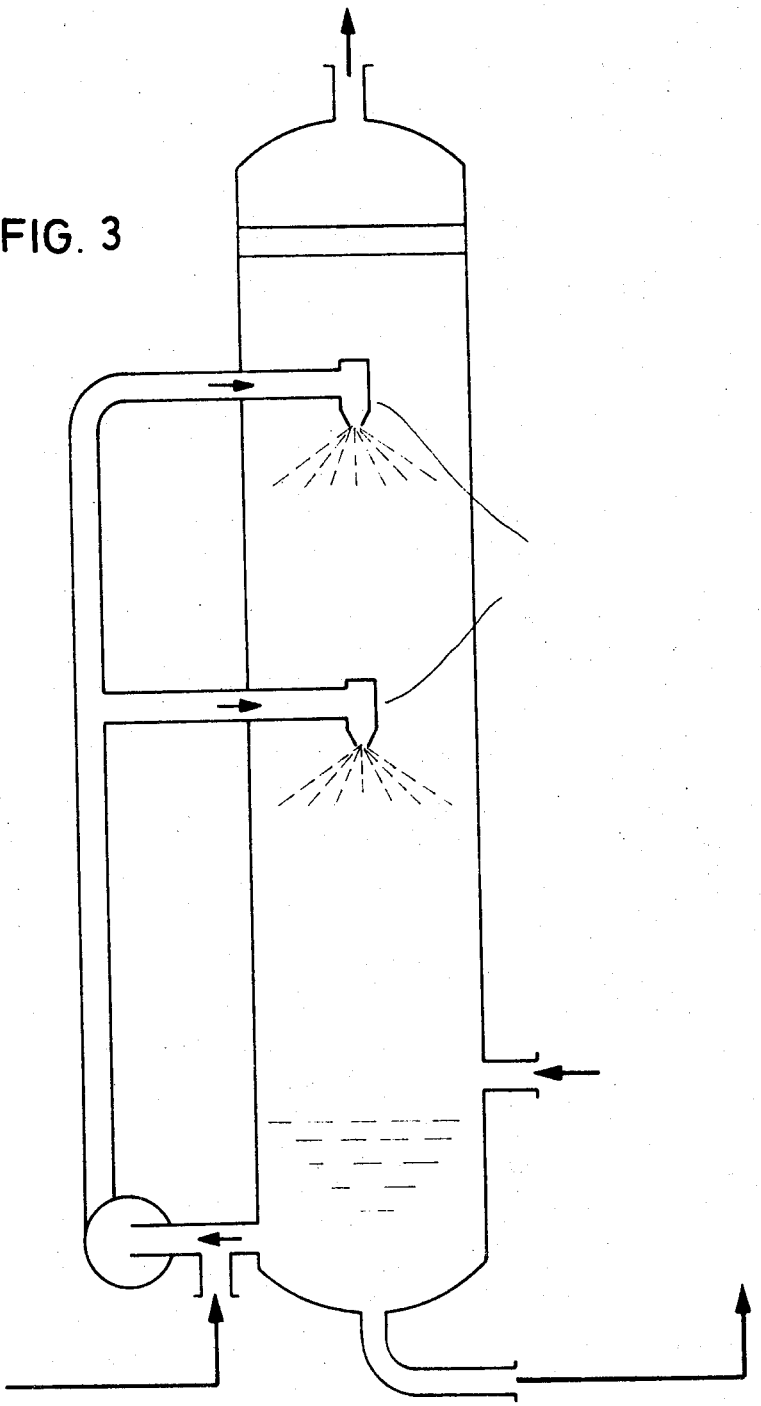
FIG. 3 shows a gas-liquid reactor in form of a spray washer.

Further, as gas-liquid reactors there are suitable for use in carrying out the process of the invention spray washers. These washers also in use do not exhibit any pressure losses. They work, however, with circulation pumps and nozzles in connection with which some clogging through the suspended $SiO_2$ can occur. The principle of a suitable spray washer for use in the process of the invention is illustrated in FIG. 3.

There can also be used as gas-liquid reactor, apparatuses provided with stirrers. There are available a large number of types of such apparatus including those provided with horizontal and vertical axes and different types of stirrer installations. Their advantage is an especially good mixing of the gas and liquid phases without any disturbances occurring through $SiO_2$ separating out. Disturbances of the operation of the reactor, particularly with respect to the stirrer in view of the nature of the fluorosilicic acid, however, presents some problems.

Finally, there has been found suitable for carrying out the process of the invention the venturi washers in which intensive intermixing of both the gas and liquid phases takes place. In view of the high turbulence present in these washers, a disturbance because of $SiO_2$ clogging does not take place. A further advantage of the venturi washer is the fact that in contrast to the other washer types, no pressure loss takes place whereby an increase in the vapor pressure from reactor to reactor is realized.

Figure 4:
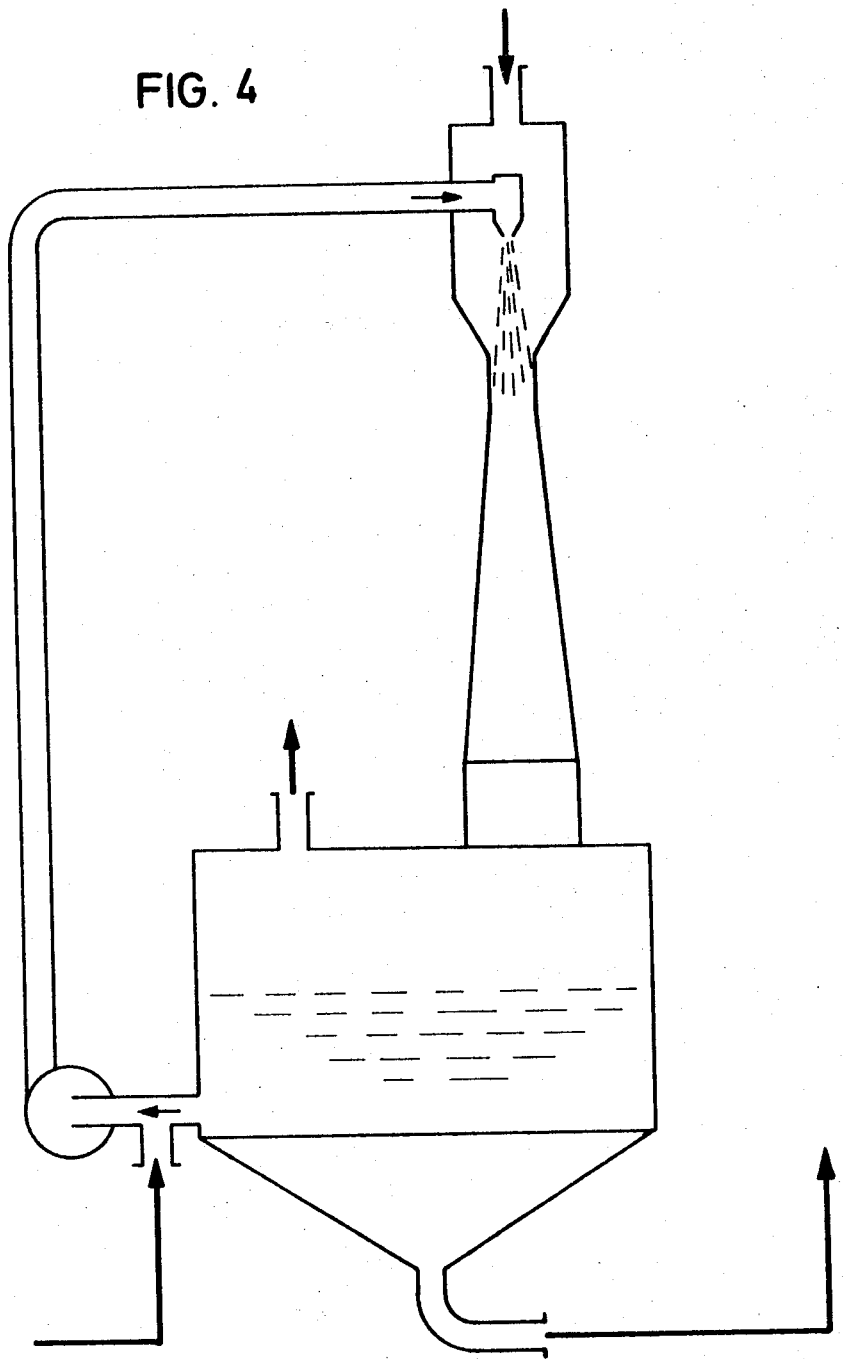
FIG. 4 shows a gas-liquid reactor in the form of a venturi washer.

The principle of a venturi washer has been set out in FIG. 4. The type of washer does require, however, for use in moving the fluorosilicic acid corrosion-resistant pumps.

The process of the invention is suitable for use in all cases where $SiF_4$ and possibly HF-containing vapors must be worked up, as for instance in the working up of $SiF_4$-containing gas fractions from other processes for recovering HF from fluorosilicic acid as well as from the discharge gases recovered in the drying of a silicic acid which has been precipitated from $H_2SiF_6$ and also in processes where F is being recovered from minerals and other technical materials.

Without further analysis, the foregoing will so fully reveal the gist of the present invention that others can by applying current knowledge readily adapt it for various applications without omitting features that, from the standpoint of prior art fairly constitute essential features of the generic or specific aspects of this invention and, therefore, such adaptations should and are intended to be included within the meaning and range of equivalence of the following claims.

What is claimed as new and desired to be secured by Letters Patent is set forth in the appended claims:

1. A process for preparing a concentrated aqueous solution of fluorosilicic acid containing at least 28% by weight of fluorosilicic acid from a dilute solution containing at most 20% by weight of fluorosilicic acid and simultaneously recovering hydrogen fluoride and silicon tetrafluoride from a gaseous mixture containing the same, such as the mixture that is formed in recovering hydrogen fluoride from aqueous solutions of fluorosilicic acid by means of a polyglycol, which process comprises the following steps: (a) passing into a heated reaction zone a stream of a gaseous mixture containing hydrogen fluoride and silicon tetrafluoride together with a stream of hot dilute aqueous fluorosilicic acid, (b) maintaining the said reaction zone at such a temperature above the boiling point of water that a substantial proportion of the silicon tetrafluoride therein is hydrolyzed to form fluorosilicic acid and silica, (c) continuously withdrawing the stream of water vapor containing residual small proportions of hydrogen fluoride and silicon tetrafluoride that are volatilized in said reaction zone, and passing the said stream from the reaction zone to a rectification zone that is maintained at such a temperature as to distill off water vapor free from hydrogen fluoride and silicon tetrafluoride while retaining therein a distilland consisting of fluorosilicic acid having a higher concentration than the dilute solution that was initially passed into the said reaction zone, (d) continuously withdrawing a slurry of silica and concentrated fluorosilicic acid from the said reaction zone and passing the said slurry in heat-exchange relationship with the stream of dilute aqueous fluorosilicic acid that is being passed into the said heated reaction zone and continuously separating the silica from the said slurry and recovering therefrom the concentrated fluorosilicic acid containing at least 28% by weight of fluorosilicic acid, (e) continuously withdrawing from the said rectification zone water vapor free from hydrogen fluoride and silicon tetrafluoride that is volatilized therein, (f) continuously passing such amounts of hydrogen fluoride into the said rectification zone as to prevent the formation of silica therein by hydrolysis of any residual amounts of silicon tetrafluoride that are present therein, and (g) continuously withdrawing portions of the distilland consisting of concentrated fluorosilicic acid from the said rectification zone and passing them to the said heated reaction zone.

2. A process as defined in claim 1 in which the water vapor containing a residual small proportion of hydrogen fluoride and silicon tetrafluoride that is volatilized in the heated reaction zone is passed from the said heated reaction zone through one or more intervening heated reaction zones preceding the rectification zone, and the distilland consisting of concentrated fluorosilicic acid that is continuously withdrawn from the rectification zone is continuously passed successively from the last of these intervening reaction zones to the first reaction zone through each of any other intervening reaction zones.

3. A process as defined in claim 1 in which the reaction zone is maintained at a temperature of approximately 108° C.

4. A process as defined in claim 1 in which the rectification zone is maintained at a temperature between 101 and 102° C.

5. A process as defined in claim 1 in which additional heat is supplied to the reaction zone by heat exchange with steam generated in drying the wet silica that is recovered in the process.

References Cited

UNITED STATES PATENTS

| | | | |
|---|---|---|---|
| 1,851,652 | 3/1932 | Soll et al. | 23—153 |
| 2,588,786 | 3/1952 | Winter | 23—153 |
| 3,004,829 | 10/1961 | Boyle et al. | 23—153 |
| 3,091,513 | 5/1963 | Parish | 23—153 |
| 3,218,128 | 11/1965 | Klem | 23—153 |
| 3,218,129 | 11/1965 | Barker et al. | 23—153 |
| 3,256,062 | 6/1966 | Wylegala | 23—153 |
| 3,257,167 | 6/1966 | Mohr et al. | 23—153 |
| 3,326,634 | 6/1967 | Porter et al. | 23—153 |
| 3,645,678 | 2/1972 | Parish et al. | 23—153 |
| 3,645,679 | 2/1972 | Parish et al. | 23—153 |

FOREIGN PATENTS

| | | | |
|---|---|---|---|
| 1,442,978 | 11/1968 | Germany | 23—153 |

EDWARD STERN, Primary Examiner

U.S. Cl. X.R.

423—336, 472, 483, 489